(12) United States Patent
Cho et al.

(10) Patent No.: US 8,633,660 B2
(45) Date of Patent: Jan. 21, 2014

(54) CONTROL DEVICE, LED LIGHT EMITTING DEVICE INCLUDING THE SAME, AND CONTROL METHOD

(75) Inventors: Gye-Hyun Cho, Bucheon (KR); Min-Ho Jung, Bucheon (KR); Sung-Yun Park, Bucheon (KR); Dong-Hwan Kim, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 347 days.

(21) Appl. No.: 13/028,628

(22) Filed: Feb. 16, 2011

(65) Prior Publication Data

US 2011/0199010 A1 Aug. 18, 2011

(30) Foreign Application Priority Data

Feb. 17, 2010 (KR) .................. 10-2010-0014309

(51) Int. Cl.
*H05B 37/02* (2006.01)
*H02M 7/217* (2006.01)

(52) U.S. Cl.
USPC .............. 315/308; 315/291; 363/89; 363/124

(58) Field of Classification Search
USPC .......... 315/200 R, 209 R, 224, 225, 291, 307, 315/308; 363/86, 89, 124
See application file for complete search history.

(56) References Cited

U.S. PATENT DOCUMENTS

| | | | |
|---|---|---|---|
| 5,818,707 A * | 10/1998 | Seong et al. | 363/89 |
| 7,259,525 B2 | 8/2007 | Yang | |
| 7,501,800 B2 | 3/2009 | Kim et al. | |
| 8,044,608 B2 * | 10/2011 | Kuo et al. | 315/291 |
| 2007/0097044 A1 | 5/2007 | Yang | |
| 2008/0018261 A1 | 1/2008 | Kastner | |
| 2010/0019809 A1 | 1/2010 | Hwang et al. | |
| 2010/0109615 A1 * | 5/2010 | Hwang et al. | 323/205 |

FOREIGN PATENT DOCUMENTS

CN 1753291 B 10/2010

* cited by examiner

*Primary Examiner* — Jimmy Vu
(74) *Attorney, Agent, or Firm* — Okamoto & Benedicto LLP

(57) ABSTRACT

The present invention relates to a switching operation control device of a power switch, an LED light emitting device including the same, and a control method thereof. The control device detects a zero crossing time when a voltage at an input end of the power switch becomes a zero voltage, generates a reference signal that is synchronized with the voltage at the input end of the power switch by using the detected zero crossing time, and compensates the generated reference signal with a first voltage that is greater than the zero voltage during a blocking period corresponding to the zero crossing time.

19 Claims, 7 Drawing Sheets

CONTROL DEVICE, LED LIGHT EMITTING DEVICE INCLUDING THE SAME, AND CONTROL METHOD

CROSS-REFERENCE TO RELATED APPLICATION

This application claims priority to and the benefit of Korean Patent Application No. 10-2010-0014309 filed in the Korean Intellectual Property Office on Feb. 17, 2010, the entire contents of which are incorporated herein by reference.

BACKGROUND OF THE INVENTION (a) Field of the Invention

The present invention relates to a control device for controlling a switching operation, an LED light emitting device including the same, and a control method.

(b) Description of the Related Art

A buck converter includes a bridge diode for rectifying an AC input. Particularly, the buck converter having no bulky capacitor varies a rectifying diode output voltage according to a load connected to the buck converter. The rectifying diode output voltage is generated by rectifying AC power that is input to the buck converter. The rectifying diode output voltage will be referred to as an input voltage hereinafter.

Also, the load connected to the buck converter depends on a switching operation of a power switch for controlling the buck converter. When the power switch (S) is not switched, input impedance of the buck converter is very large, and hence an input voltage has a constant DC offset voltage. The DC offset voltage applies a negative influence to detection of an input voltage or phase.

FIG. 1 shows an LED light emitting device for emitting a plurality of LEDs by supplying current to an LED string including a plurality of LEDs using a buck converter. In FIG. 1, the rectifying diode is realized with a bridge diode 14.

As shown in FIG. 1, in the LED light emitting device, AC power (AC) is rectified by passing through the bridge diode 14. The bridge diode 14 full-wave rectifies the input AC power. The rectified voltage, that is, the input voltage, is supplied to the inductor 11, and the inductor 11 supplies a driving current to a plurality of LEDs according to an operation of the power switch (S). The switch 15 including the power switch (S) controls a switching operation of the power switch (S).

When the power switch (S) is turned on, inductor current (IL) flowing to the inductor 11 is increased, and when the power switch (S) is turned off, the inductor current (IL) is reduced. The peak value of the inductor current (IL) for a single switching period follows the full wave rectified current having passed through the bridge diode 14. Therefore, the peak value of the inductor current (IL) follows the full wave rectified sine wave, and the inductor current (IL) rises up to the peak value and then falls periodically. The duty of the power switch (S) is determined by the input voltage. In detail, the duty is reduced as the input voltage is increased and the duty is increased as the input voltage is reduced in order to maintain output power.

Information on the input voltage is needed to control the switching operation of the power switch (S). A voltage at an input end of the power switch (S) electrically connected to the bridge diode 14 has a waveform similar to the input voltage.

In this instance, if the switch 15 controls the switching operation of the power switch (S) while the input voltage does not become a zero voltage because of load variation or noise in the input AC power, the switch 15 controls the power switch (S) based on the wrong input voltage information by a DC offset voltage of the input voltage. When the power switch (S) is mistakenly controlled, noise occurs by the switching operation of the power switch (S), and the input voltage is not reduced to be near 0 volts.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a control device for controlling a converter that is operable free from noise, and a control method.

The present invention has been made in another effort to provide an LED light emitting device including a control device.

An exemplary embodiment of the present invention provides a control device for controlling a switching operation of a power switch, including: a reference signal generator for detecting a zero crossing time when a voltage at an input end of the power switch becomes a zero voltage, generating a reference signal that is synchronized with the voltage at the input end of the power switch by using the detected zero crossing time, and compensating the generated reference signal with a first voltage that is greater than the zero voltage during a blocking period corresponding to the zero crossing time; and a PWM controller for controlling and switching the switching operation of the power switch by comparing a sensing current corresponding to current flowing to the power switch and the compensated reference signal.

The reference signal generator includes: a voltage detector for generating a detecting voltage corresponding to the voltage at the input end of the power switch; a zero crossing detector for comparing the detecting voltage and a predetermined threshold voltage for detecting the blocking period, detecting the blocking period according to the comparison result, and generating a zero crossing detecting signal that is variable by the blocking period; a reference clock signal generator for generating a reference clock signal for controlling the reference signal to be synchronized with the voltage at the input end of the power switch by using the zero crossing detecting signal and predetermined clock signals; a digital sine wave generator for generating a digital signal that is sequentially increased and is decreased according to the reference clock signal during one period of the reference signal by using the reference clock signal and the zero crossing detecting signal; a digital-analog converter for generating the reference signal by converting the digital signal into an analog signal; and a compensator for maintaining the reference signal at a first voltage during the blocking period by using the zero crossing detecting signal and the reference signal.

The voltage detector includes: a voltage-current converting means for generating a detecting current corresponding to the voltage at the input end of the power switch; and a resistor to which the detecting current flows, and the detecting voltage is generated by the resistor.

The zero crossing detecting signal has a first level during a first period from a time when the detecting voltage that is generated when the power switch is turned off becomes less than the threshold voltage to a time when it becomes greater than the threshold voltage, and a second level that is different from the first level during a period except the first period, wherein the first period is the blocking period.

The reference clock signal generator estimates a continuous zero crossing time by using the zero crossing detecting signal, sets a gap between the estimated zero crossing times as a period of the reference signal, and generates a reference clock signal that includes rising and falling edges by a predetermined reference number of times for one period of the reference signal by dividing the clock signals.

The estimated zero crossing time is a random time of the blocking period, and the reference number of times is set to generate the reference signal into a waveform that follows the voltage at the input end of the power switch.

The digital sine wave generator increases the digital signal from a time when a first edge of the reference clock signal occurring during one period of the reference signal to a time when an n-th edge of the reference clock signal corresponding to a half of the reference number of times occurs, and it reduces the digital signal from a time when an (n+1)-th edge is generated to a time when an edge of the reference clock signal corresponding to the reference number of times occurs.

The reference signal generator includes: a voltage detector for generating a detecting voltage corresponding to the voltage at the input end of the power switch; a zero crossing detector for comparing the detecting voltage and a predetermined threshold voltage for detecting the blocking period, detecting the blocking period according to the comparison result, and generating a zero crossing detecting signal that is variable by the blocking period; a reference clock signal generator for generating a reference clock signal for controlling the reference signal to be synchronized with the voltage at the input end of the power switch by using the zero crossing detecting signal and predetermined clock signals; a digital sine wave generator for generating a digital signal that is sequentially increased and is decreased according to the reference clock signal during one period of the reference signal by using the reference clock signal and the zero crossing detecting signal; and a digital-analog converter for generating the reference signal by converting the digital signal into an analog signal, wherein the digital signal is maintained during the blocking period.

The voltage detector includes: a voltage-current converting means for generating a detecting current corresponding to the voltage at the input end of the power switch; and a resistor to which the detecting current flows, and the detecting voltage is generated by the resistor.

The zero crossing detecting signal has a first level during a first period from a time when the detecting voltage that is generated when the power switch is turned off becomes less than the threshold voltage to a time when it becomes greater than the threshold voltage, and a second level that is different from the first level during a period except the first period, and the first period is the blocking period.

The reference clock signal generator estimates a continuous zero crossing time by using the zero crossing detecting signal, sets a gap between the estimated zero crossing times as a period of the reference signal, and generates a reference clock signal that includes rising and falling edges by a predetermined reference number of times for one period of the reference signal by dividing the clock signals.

The estimated zero crossing time is a random time of the blocking period, and the reference number of times is set to generate the reference signal into a waveform that follows the voltage at the input end of the power switch.

Another embodiment of the present invention provides a switching control method of a power switch including: detecting a zero crossing time when a voltage at an input end of the power switch becomes zero voltage; generating a reference signal that is synchronized with the voltage at the input end of the power switch by using the detected zero crossing time; and compensating the generated reference signal with a first voltage that is greater than the zero voltage during a blocking period corresponding to the zero crossing time.

The switching control method further includes controlling the switching operation of the power switch by comparing a sensing current corresponding to current flowing to the power switch and the compensated reference signal.

The generating of a reference signal includes: generating a detecting voltage corresponding to the voltage at the input end of the power switch; comparing the detecting voltage and a predetermined threshold voltage for detecting the blocking period, detecting the blocking period according to the comparison result, and generating a zero crossing detecting signal that is variable by the blocking period; generating a reference clock signal for controlling the reference signal to be synchronized with the voltage at the input end of the power switch by using the zero crossing detecting signal and predetermined clock signals; generating a digital signal that is sequentially increased and is decreased according to the reference clock signal during one period of the reference signal by using the reference clock signal and the zero crossing detecting signal; and generating the reference signal by converting the digital signal into an analog signal.

The digital signal is maintained during the blocking period.

Yet another embodiment of the present invention provides an LED light emitting device including: an LED string including a plurality of LEDs; a converter for supplying current to the LED string according to a switching operation by a power switch; and a control device for detecting a zero crossing time when a voltage at an input end of the power switch becomes a zero voltage, generating a reference signal that is synchronized with the voltage at the input end of the power switch by using the detected zero crossing time, compensating the generated reference signal with a first voltage that is greater than the zero voltage during a blocking period corresponding to the zero crossing time, and controlling and switching the switching operation of the power switch by comparing a sensing current corresponding to current flowing to the power switch and the compensated reference signal.

The control device includes a reference signal generator for generating and compensating the reference signal, and the reference signal generator includes: a voltage detector for generating a detecting voltage corresponding to the voltage at the input end of the power switch; a zero crossing detector for comparing the detecting voltage and a predetermined threshold voltage for detecting the blocking period, detecting the blocking period according to the comparison result, and generating a zero crossing detecting signal that is variable by the blocking period; a reference clock signal generator for generating a reference clock signal for controlling the reference signal to be synchronized with the voltage at the input end of the power switch by using the zero crossing detecting signal and predetermined clock signals; a digital sine wave generator for generating a digital signal that is sequentially increased and is decreased according to the reference clock signal during one period of the reference signal by using the reference clock signal and the zero crossing detecting signal; a digital-analog converter for generating the reference signal by converting the digital signal into an analog signal; and a compensator for maintaining the reference signal at a first voltage during the blocking period by using the zero crossing detecting signal and the reference signal.

The control device includes a reference signal generator for generating and compensating the reference signal, and the reference signal generator includes: a voltage detector for generating a detecting voltage corresponding to the voltage at the input end of the power switch; a zero crossing detector for comparing the detecting voltage and a predetermined threshold voltage for detecting the blocking period, detecting the blocking period according to the comparison result, and generating a zero crossing detecting signal that is variable by the blocking period; a reference clock signal generator for generating a reference clock signal for controlling the reference signal to be synchronized with the voltage at the input end of the power switch by using the zero crossing detecting signal and predetermined clock signals; a digital sine wave generator for generating a digital signal that is sequentially increased and is decreased according to the reference clock signal during one period of the reference signal by using the reference clock signal and the zero crossing detecting signal; and a digital-analog converter for generating the reference signal by converting the digital signal into an analog signal, wherein the digital signal is maintained at the first voltage during the blocking period.

According to an embodiment of the present invention, a control device for controlling a switching operation without influence of noise, an LED light emitting device including the same, and a control method are provided.

DETAILED DESCRIPTION OF THE EMBODIMENTS

Figure 1:
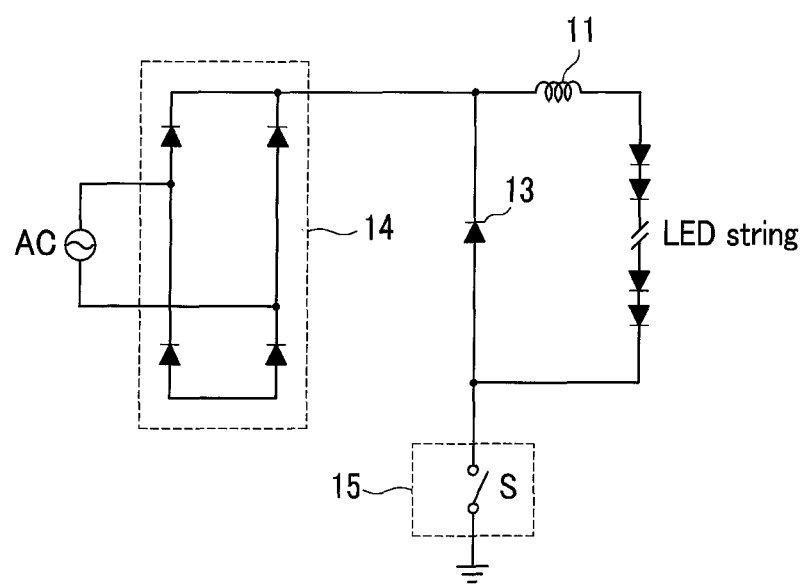
FIG. 1 shows an LED light emitting device for emitting a plurality of LEDs by supplying current to an LED string including a plurality of LEDs using a buck converter.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A converter, a converter control device, and an LED light emitting device including the same according to an exemplary embodiment of the present invention will now be described with reference to drawings.

Figure 2:
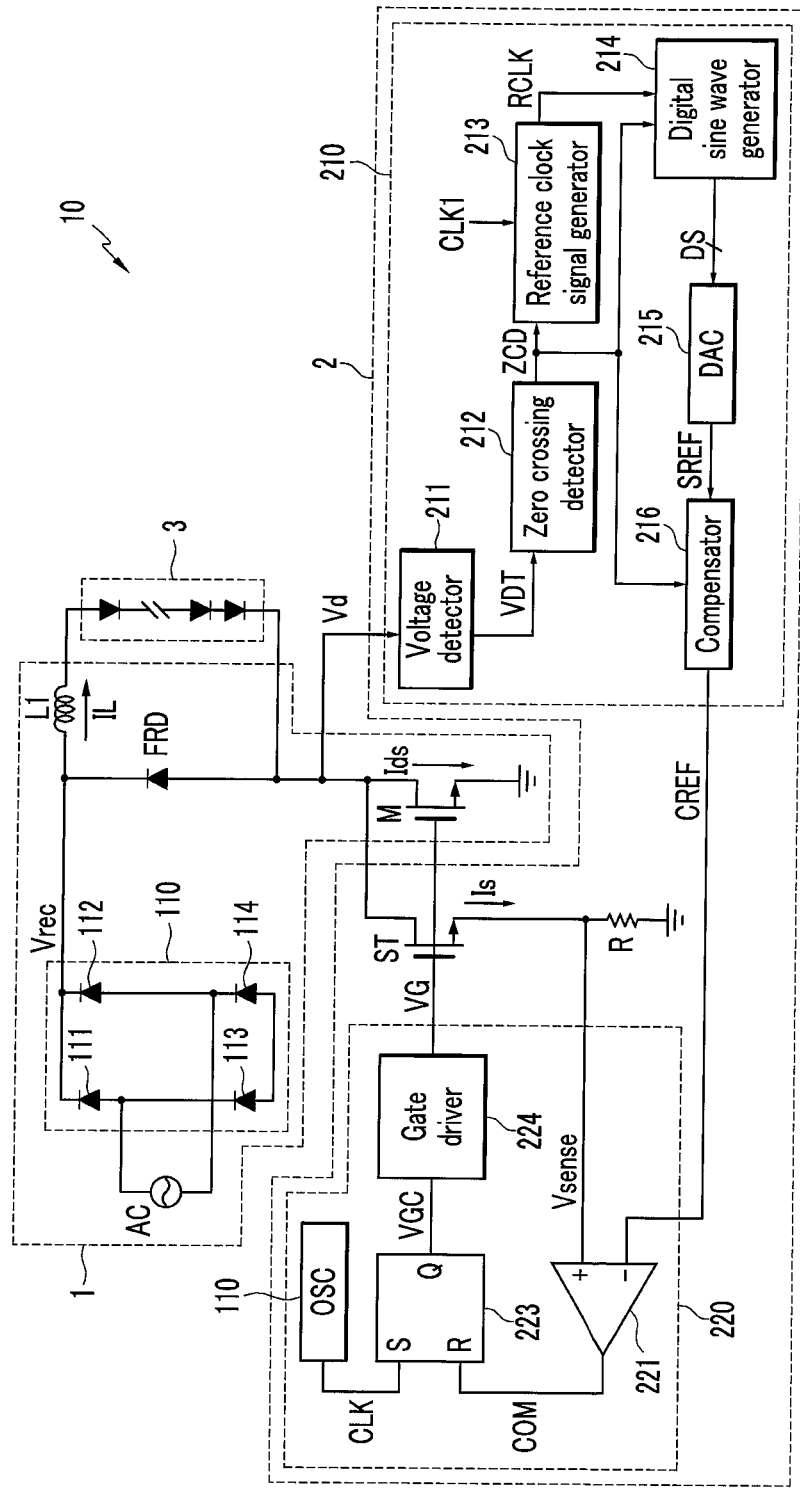
FIG. 2 shows an LED light emitting device including a converter and a control device for controlling the converter according to an exemplary embodiment of the present invention.

FIG. 2 shows an LED light emitting device 10 including a converter 1 and a control device 2 for controlling the converter 1 according to an exemplary embodiment of the present invention.

As shown in FIG. 2, a power switch (M) of the converter 1 is switched according to a gate signal (VG) transmitted by the control device 2. The power switch (M) is configured with an n-channel metal oxide semiconductor filed effect transistor (NMOSFET). A sensing transistor (ST) that has a drain electrode connected to a drain electrode of the power switch (M) and that is switched by the gate signal (VG) senses current flowing to the power switch (M). The current flowing to a sensing transistor (ST) is very much less than the current flowing to the power switch (M), and the current flowing to the sensing transistor (ST) flows to a resistor (R) to generate a sensing voltage (Vsense). The sensing transistor (ST) includes an NMOSFET.

The converter 1 includes a power switch (M), a bridge diode 110, a diode (FRD), and an inductor (L1).

The bridge diode 110 includes 4 diodes 111 to 114, and generates a full wave rectifying voltage (Vrec) by full wave rectifying the input AC power (AC).

An output end of the bridge diode 110 is connected to a first end of the inductor L1. The full wave rectifying voltage (Vrec) is supplied to the first end of the inductor L1, and a second end of the inductor L1 is connected to a first end of the LED string 3. The diode (FRD) is a fast recovery diode, and it is connected to the drain electrode of the power switch (M) and the first end of the inductor L1. The diode (FRD) provides a path on which reverse recovery current generated by the switching operation of the power switch (M) flows.

The drain electrode of the power switch (M) is connected to a second end of the LED string 3, a source electrode thereof is grounded, and a gate electrode thereof receives the gate signal (VG) from the control device 2. The power switch (M) is switched by the gate signal (VG).

The sensing transistor (ST) includes a drain electrode connected to the drain electrode of the power switch (M), a gate electrode for receiving the gate signal (VG), and a grounded source electrode. The sensing transistor (ST) senses the current flowing to the power switch (M).

The power switch (M) is turned on, and the inductor current (IL) flows through the LED string 3 and the power switch (M). The sensing current (Is) having a predetermined ratio compared to the current (hereinafter, drain current (Ids)) flowing to the power switch (M) flows to the sensing transistor (ST). Power rectified by the bridge diode 12 is supplied to the LED string 3 according to the switching operation of the power switch (M). When the power switch (M) is turned on, inductor current (IL) flowing to the inductor (L) occurs, the inductor current (IL) is supplied to the LED string 3, and the LED string 3 emits light.

The control device 2 senses a voltage (hereinafter, drain voltage (Vd)) at an input end of the power switch (M), that is, at the drain electrode of the power switch (M), to generate a reference signal (SREF) following the waveform of the drain voltage (Vd), and uses the compensated reference signal (CREF) and the sensing current (Is) to control the switching operation of the power switch (M). In this instance, the control device 2 detects an interval (hereinafter, blocking interval) in which the drain voltage (Vd) is near the zero voltage so as to detect a zero crossing time when the drain voltage (Vd) becomes the zero voltage. The blocking interval corresponds to the zero crossing time. The control device 2 maintains the reference signal (SREF) at a constant voltage that is greater than the zero voltage in the blocking interval to generate a compensation reference signal (CREF). The power switch (M) maintains the turn-on state during the blocking interval.

The control device 2 includes a reference signal generator 210 and a PWM controller 220.

The reference signal generator 210 senses the drain voltage (Vd) of the power switch (M) and generates a reference signal (SREF) following the sensed drain voltage (Vd). The reference signal generator 210 detects the time when the drain voltage (Vd) crosses 0, and generates a reference signal (SREF) having a gap between the detected times as a period. When the drain voltage (Vd) is influenced by noise of the bridge diode, the drain voltage (Vd) generates noise, and it is difficult to accurately detect the time when the drain voltage (Vd) crosses 0 in the blocking interval because of the noise. Then, the reference signal (SREF) does not follow the drain voltage (Vd).

When the reference signal (SREF) does not follow the drain voltage (Vd), a phase difference between the full wave rectifying voltage and the inductor current is increased to reduce the power factor. The power factor is improved as the phase difference between the full wave rectifying voltage and the inductor current becomes less, and when the period of the reference signal (SREF) is varied, the period of the inductor current is also varied. The drain voltage (Vd) has the same phase and period as the full wave rectifying voltage, and when the reference signal (SREF) does not follow the drain voltage (Vd), a phase difference between the full wave rectifying voltage and the inductor current is increased. As a result, the power factor of the converter 1 is deteriorated. To prevent this problem, a reference signal (SREF) that is not influenced by noise and follows the drain voltage (Vd) is generated.

Figure 3:
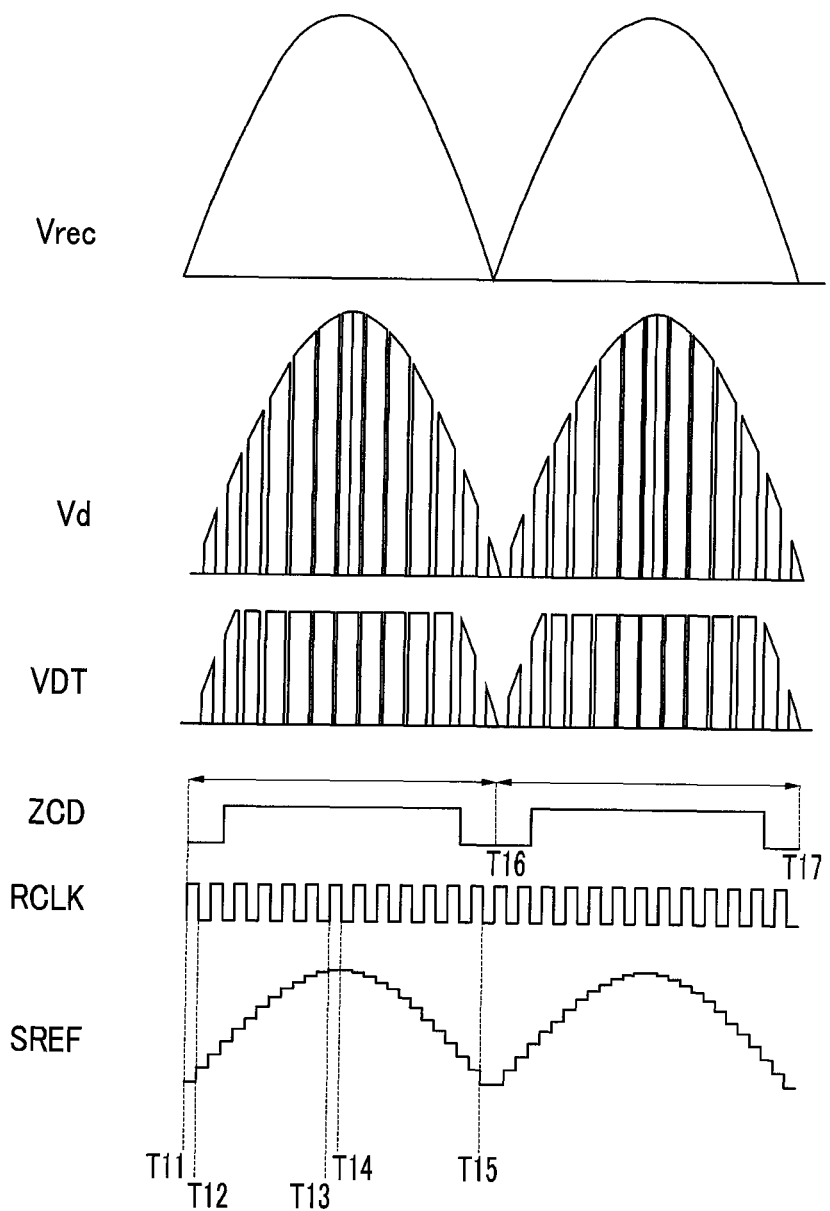
FIG. 3 shows a full wave rectifying voltage, a drain voltage, a detecting voltage, a zero crossing detecting signal, a reference clock signal, and a reference signal according to an exemplary embodiment of the present invention.

Referring to FIG. 3, an operation of the reference signal generator 210 according to an exemplary embodiment of the present invention will now be described in detail.

FIG. 3 shows a full wave rectifying voltage, a drain voltage, a detecting voltage, a zero crossing detecting signal, a reference clock signal, and a reference signal according to an exemplary embodiment of the present invention. The full wave rectifying voltage, drain voltage, and detecting voltage shown in FIG. 3 are shown as waveforms that occur when no noise is generated.

As shown in FIG. 3, the drain voltage (Vd) follows the full wave rectifying voltage (Vrec) when the power switch (M) is turned off. When the power switch (M) is turned on, the drain voltage (Vd) becomes 0 volts.

The reference signal generator 210 includes a voltage detector 211, a zero crossing detector 212, a reference clock signal generator 213, a digital sine wave generator 214, a digital-to-analog converter (DAC) 215, and a compensator 216.

The voltage detector 211 receives the drain voltage (Vd), and generates a detecting voltage (VDT) corresponding to a drain voltage (Vd). When the sensed drain voltage (Vd) is greater than a predetermined clamp voltage, the voltage detector 211 outputs the clamp voltage as the detecting voltage (VDT). Therefore, the detecting voltage (VDT) shown in FIG. 3 is generated. The voltage detector 211 includes a voltage-current converting means for generating current according to the drain voltage (Vd), and generates a voltage that corresponds to the detecting current generated by the voltage-current converting means as the detecting voltage (VDT). The voltage-current converting means increases current as the drain voltage (Vd) is increased, and generates constant current when the drain voltage (Vd) becomes greater than the clamping voltage. In detail, one of the enhancement metal-oxide semiconductor field effect transistor, the junction gate field-effect transistor (JFET), the depletion metal-oxide semiconductor field effect transistor (MOSFET), and the bipolar junction transistor (BJT) is used to realize this. The above-noted transistors generate current that increases according to the drain voltage (Vd) in the linear area, and generate current that is constant irrespective of the drain voltage (Vd) in the saturation area. In the exemplary embodiment of the present invention, the JFET is used for the voltage-current converting means.

Figure 4:
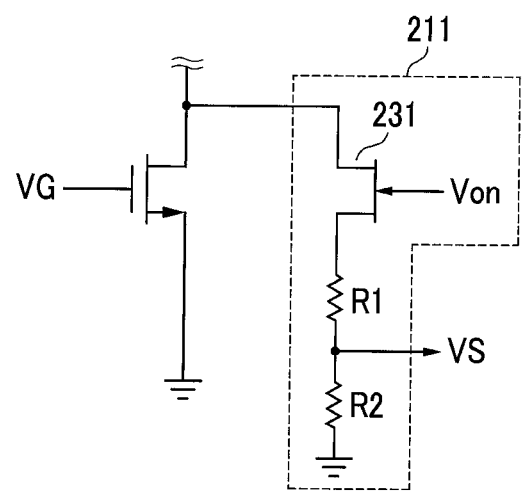
FIG. 4 shows a voltage detector according to an exemplary embodiment of the present invention.

FIG. 4 shows a voltage detector 211 according to an exemplary embodiment of the present invention. Current of a JFET 231 represents a detecting current corresponding to a drain voltage (Vd).

The voltage detector 211 includes a JFET 231, a resistor R1, and a resistor R2. A gate-source voltage of the JFET 231 is greater than a threshold voltage of the JFET, and a voltage at a drain electrode of the JFET 231 corresponds to the drain voltage (Vd). Therefore, when the JFET 231 is operable in the linear area, current of the JFET 231 is increased in proportion to the drain voltage (Vd), and when the drain voltage (Vd) is increased and the JFET 231 is operable in the saturation area, current of the JFET 231 is maintained at a constant value irrespective of the drain voltage (Vd). When the current of the JFET 231 flows to the resistor R2, the detecting voltage (VDT) is generated.

The zero crossing detector 212 senses a blocking period in which the drain voltage (Vd) approaches the zero voltage by using a detecting voltage, and generates a zero crossing detecting signal (ZCD) for indicating the blocking period. Since the drain voltage (Vd) is 0 volts while the power switch is turned on, the detecting voltage occurs when the power switch is turned off. That is, the zero crossing detector 212 compares the detecting voltage and the threshold voltage when the power switch is turned off. The above-noted blocking period represents a period from a time in which the detecting voltage when the power switch is turned off becomes less than a predetermined threshold voltage to a time in which the detecting voltage reaches the threshold voltage. The zero crossing detector generates a zero crossing detection signal (ZCD) that has a high level while the detecting voltage is greater than the threshold voltage, and that has a low level during the blocking period. It is determined in the exemplary embodiment of the present invention that the drain voltage (Vd) crosses 0 volts at one time during the blocking period.

Figure 5:
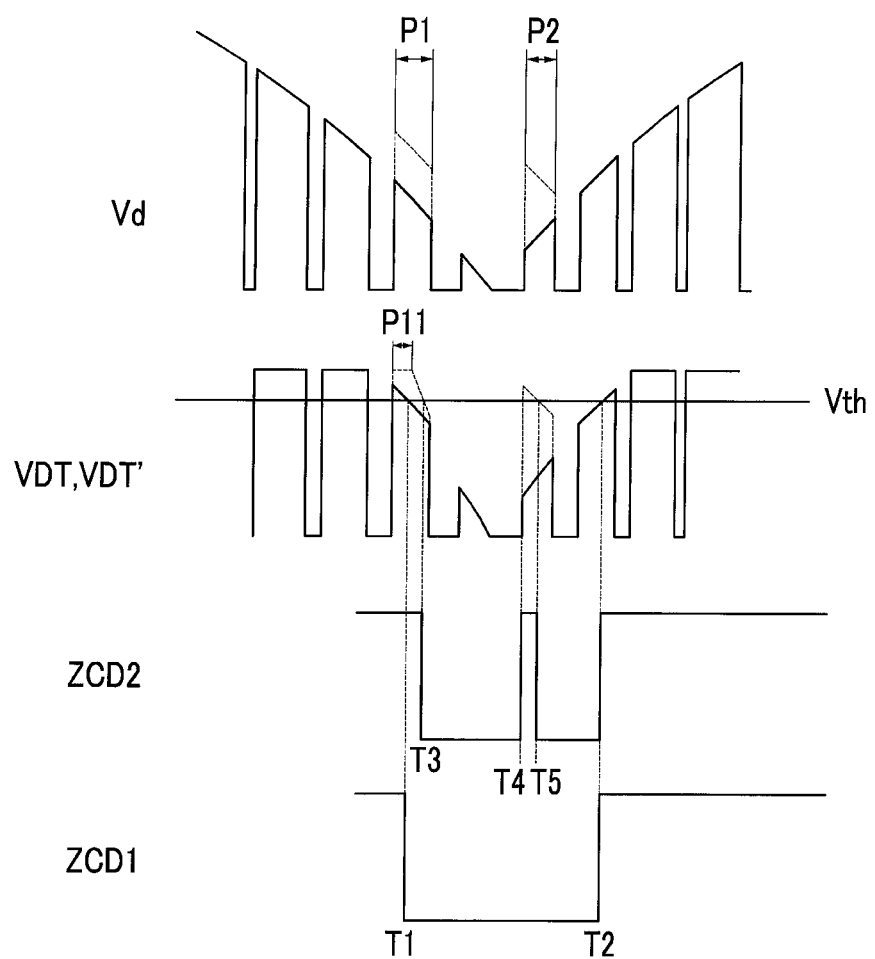
FIG. 5 shows an influence by noise that is generated in a detecting voltage according to noise of a drain voltage to a zero crossing detecting signal.

FIG. 5 shows an influence by noise that is generated in a detecting voltage according to noise of a drain voltage (Vd) to a zero crossing detecting signal (ZCD).

In FIG. 5, the solid line shows the drain voltage (Vd), the detecting voltage, and the zero crossing detecting signal when the drain voltage (Vd) has no noise, and the dotted line indicates the drain voltage (Vd), the detecting voltage, and the zero crossing detecting signal when the drain voltage (Vd) has noise. As shown in FIG. 5, it is assumed that noise has occurred in the drain voltage (Vd) during the period P1 and the period P2.

When there is no noise, the detecting voltage is reduced to be the threshold voltage and the zero crossing detecting signal ZCD1 falls to the low level at the time T1. At the time T2, the detecting voltage rises to the threshold voltage and the zero crossing detecting signal ZCD2 rises to the high level.

During the period P11 in the period P1, the drain voltage (Vd) caused by noise operates the JFET 231 in the saturation area. The detecting voltage (VDT') shown by the dotted line is maintained during the period P11, and the detecting voltage (VDT') is reduced to be less than the threshold voltage (Vth) at the time T3. That is, at the time T3, the zero crossing detecting signal ZCD2 falls to the low level.

When the detecting voltage (VDT') becomes greater than the threshold voltage (Vth) by noise at the time T4, the zero crossing detecting signal ZCD2 rises to the high level. When the detecting voltage is reduced to be less than the threshold voltage (Vth) at the time T5, the zero crossing detecting signal ZCD2 falls to the low level.

When the detecting voltage (VDT) rises to the threshold voltage (Vth) at the time T2, the zero crossing detecting signal ZCD2 rises to the high level.

Accordingly, when the zero crossing detecting signal ZCD2 occurs by noise, the drain voltage (Vd) zero crossing time cannot be predicted accurately. FIG. 5 is given to describe the influence caused by noise, when the zero crossing detector 212 fails to sense the detecting voltage that is less than the threshold voltage (Vth) because of actual noise, the period of the zero crossing detecting signal (ZCD) can be greater than twice as great as the drain voltage (Vd).

The reference clock signal generator 213 receives a predetermined clock signal (CLK1) and a zero crossing detecting signal (ZCD), and generates a reference clock signal (RCLK) for generating a synchronized reference signal (SREF) synchronized with the drain voltage (Vd). In this instance, the reference signal (SREF) follows the full-wave-rectified sine wave that is synchronized with the waveform of the drain voltage (Vd). The predetermined clock signal CLK1 can be provided by the oscillator 222. The reference clock signal generator 213 estimates the sequential zero crossing times by using the zero crossing detecting signal (ZCD), sets the interval between the estimated zero crossing times as one period of the reference signal (SREF), and generates a reference clock signal (RCLK) including edges that rise and fall by a predetermined number of times for the period by dividing the clock signal CLK1. Here, the drain voltage (Vd) crosses zero at the zero crossing time. A time from among random times in the blocking period can be estimated as the zero crossing time. A period between the two estimated continuous zero crossing times corresponds to one period of the drain voltage (Vd), and it is one period of the reference signal (SREF) that is generated after the second zero crossing time from among the two zero crossing times.

The reference number of times is fixed to be constant. The reference number of times is determined by a number of times of rising and falling of the reference signal (SREF) that is required for the reference signal (SREF) to be generated as a waveform that follows the drain voltage (Vd). In the exemplary embodiment of the present invention, the reference signal (SREF) is controlled to gradually rise for a predetermined period, and it is controlled to gradually fall for a predetermined period. In this instance, the sum of the number of times of rising and the number of times of falling is fixed to be constant, and the sum of the number of times of rising and the number of times of falling is the reference number of times.

The reference clock signal generator 213 sets the period (T11-T16 in FIG. 3) between the two estimated continuous zero crossing times as one period of the reference signal (SREF) after the second zero crossing time T16 from among the continuous zero crossing times. The reference clock signal generator 213 sets a period between a second zero crossing time T15 and a third zero crossing time T16 as one period of the reference signal (SREF) after the third zero crossing time T16. The drain voltages (Vd) of the continuous periods are very similar. Therefore, when the reference signal (SREF) corresponding to the drain voltage (Vd) of the current period by using the period that is determined as the estimated continuous zero crossing time according to the drain voltage (Vd) of the previous period, the error can be ignored.

The period of the reference signal (SREF) following the drain voltage (Vd) is estimated by repeating the above operation, and the reference clock signal (RCLK) is generated.

The digital sine wave generator 214 receives the zero crossing detecting signal (ZCD) and the reference clock signal (RCLK), and uses the two signals to generate a digital signal (DS) for generating a full wave rectify sine wave that is synchronized with the drain voltage (Vd). The digital signal (DS) has n-bit digital values, and it has n-bit digital values having the same number as the reference number of times for one period of the estimated reference signal (SREF). The digital sine wave generator 214 senses the start and the end of one period of the reference signal (SREF) by using the zero crossing detecting signal (ZCD), and transmits an n-bit digital signal (DS) to the DAC 215 synchronized with the reference clock signal (RCLK).

The digital signal (DS) is increased for the period that corresponds to a half of the one period of the estimated reference signal (SREF), and it is decreased for the other half period, which is controlled according to the reference number of times. For example, when the reference number of times is given as 24, the digital signal (DS) is increased and the reference signal (SREF) is sequentially increased from the time T12 when the first edge of the reference clock signal (RCLK) occurs after the first zero crossing time (T11 in FIG. 3) from among the continuous zero crossing times to the time T13 when the 12th edge occurs. The edge includes a rising time and a falling time. An increment of the digital value is set to be an appropriate value for generating the full-wave rectification sine wave.

The digital signal (DS) is reduced and the reference signal (SREF) is sequentially reduced from the time T14 when the 13th edge of the reference clock signal (RCLK) to the time T15 when the 24th edge occurs. A decrement of the digital signal (DS) is set to be an appropriate value so as to generate a full-wave rectification sine wave.

As shown in FIG. 3, it is synchronized with the edge time of the reference clock signal (RCLK), and the reference signal (SREF) rises or falls to be a full wave rectification sine wave.

The digital value has been described to be transmitted to the DAC 215 at the edge time of the reference clock signal (RCLK), and the present invention is not limited thereto. The digital value can be transmitted to the DAC 215 at one of the rising time and the falling time of the reference clock signal (RCLK). Then, the frequency of the reference clock signal (RCLK) is doubled compared to the case in which the digital value is transmitted to the DAC 215 at the edge time of the reference clock signal (RCLK).

The DAC 215 converts the input digital signal (DS) into an analog voltage signal in real time, and outputs it. The voltage signal output by the DAC 215 becomes the reference signal (SREF). The reference signal (SREF) is similar to the full-wave rectify sine wave.

The compensator 216 receives the reference signal (SREF) and the zero crossing detecting signal (ZCD) to generate a compensation reference signal (CREF) having the high level during the blocking period.

Figure 6:
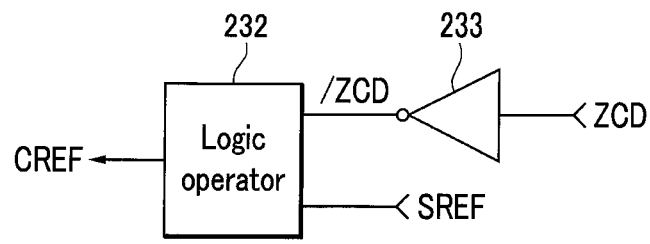
FIG. 6 shows a compensator according to an exemplary embodiment of the present invention.

FIG. 6 shows a compensator 216 according to an exemplary embodiment of the present invention.

As shown in FIG. 6, the compensator 216 includes a logic operator 232 and an inverter 233.

The inverter 233 inverts the zero crossing detecting signal (ZCD) and outputs the inverted zero crossing detecting signal (/ZCD) to the logic operator 232, and the logic operator 232 outputs a high-level compensation reference signal (CREF) irrespective of the reference signal (SREF) when the inverted zero crossing detecting signal (/ZCD) is high-level. In this instance, the high level is substantially greater than the sensing voltage. The logic operator 232 outputs the reference signal (SREF) when the inverted zero crossing detecting signal (/ZCD) is low-level.

The PWM controller 220 controls a PWM comparator 221, an oscillator 222, an SR latch 223, and a gate driver 224.

The PWM comparator 221 includes a non-inverting terminal (+) for receiving a sensing voltage (Vsense) and an inverting terminal (−) for receiving a compensation reference signal (CREF). The PWM comparator 221 outputs a high-level comparing signal (COM) when the signal input to the non-inverting terminal (+) is greater than the signal input to the inverting terminal (−), and it outputs a low-level comparing signal (COM) in another case. The oscillator 222 generates clock signals (CLK) for determining the switching frequency of the power switch (M).

The SR latch 223 generates a gate driver control signal (VGC) according to the comparing signal (COM) and the clock signal (CLK). The SR latch 223 includes a set terminal (S) for receiving the clock signals (CLK), a reset terminal (R) for receiving the comparing signal (COM), and an output terminal (Q). The SR latch 223 generates and maintains a high-level gate driver control signal (VGC) when the clock signal rises, and it generates a low-level gate driver control signal when the comparing signal (COM) rises.

The gate driver 224 generates a gate signal (VG) for controlling the switching operation of the power switch according to the gate driver control signal (VGC). The power switch is turned on when the gate signal (VG) is high-level, and it is turned off when the gate signal (VG) is low-level. The gate driver 224 generates a high-level gate signal (VG) according to the high-level gate driver control signal (VGC), and generates a low-level gate signal (VG) according to the low-level gate driver control signal (VGC).

Figure 7:
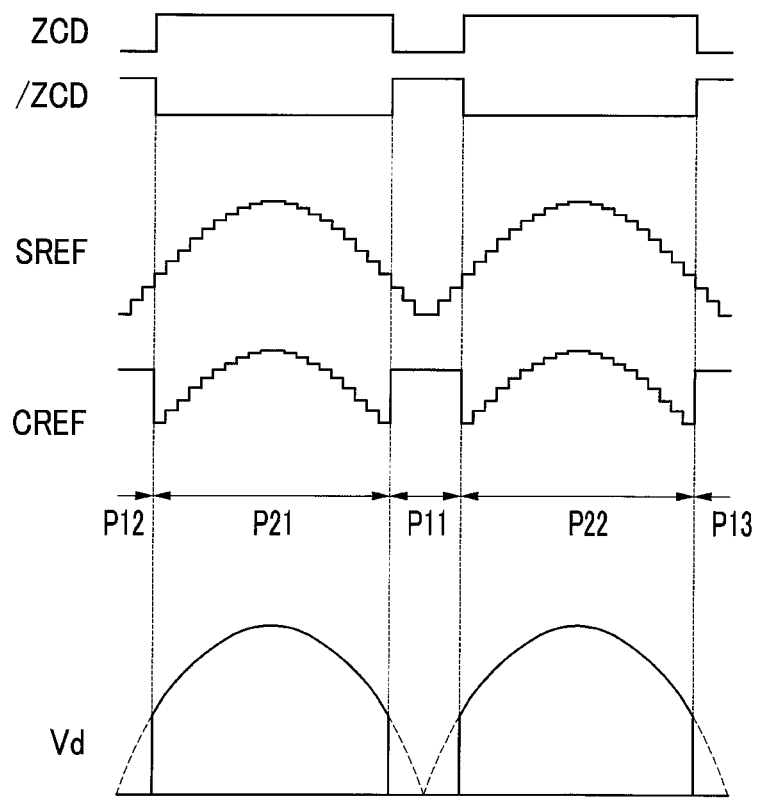
FIG. 7 shows a compensation reference signal and a drain voltage when a switching operation is controlled by the compensation reference signal according to an exemplary embodiment of the present invention.

FIG. 7 shows a compensation reference signal (CREF) and a drain voltage (Vd) when a switching operation is controlled by the compensation reference signal (CREF) according to an exemplary embodiment of the present invention.

As shown in FIG. 7, a compensation reference signal (CREF) has a high level during the periods P11, P12, and P13 when the inverted zero crossing detecting signal (/ZCD) is high level and corresponds to the reference signal (SREF) during the periods P21 and P22 when the inverted zero crossing detecting signal (/ZCD) is low level.

The sensing voltage (Vsense) is generated when the sensing current (Is) having a predetermined ratio of the drain current (Ids) flows to the resistor (R). When the sensing voltage (Vsense) reaches the compensation reference signal (CREF), the PWM comparator 221 generates a high-level comparing signal, and the high-level comparing signal (COM) is input to the reset terminal (R). The, the gate driver control signal becomes low-level, the gate signal becomes low-level, and the power switch (M) is turned off. When the clock signal (CLK) rises, the gate driver control signal becomes high-level to turn on the power switch (M).

Since the compensation reference signal (CREF) is high-level and the high-level is set to be greater than the sensing voltage during the blocking periods P11, P12, and P13, the time when the comparing signal (COM) rises does not occur. The SR latch 223 maintains the high-level gate driver control signal during the blocking period. Hence, the power switch (M) is maintained to be turned on during the blocking period.

As shown in FIG. 7, the drain voltage (Vd) has the zero voltage during the blocking periods P11-13.

Therefore, when the power switch (M) is turned on during the blocking period, the drain voltage (Vd) is maintained at the zero voltage, and hence the case in which the period of the reference signal (SREF) becomes different from the drain voltage (Vd) by noise of the drain voltage (Vd) occurs.

Figure 8:
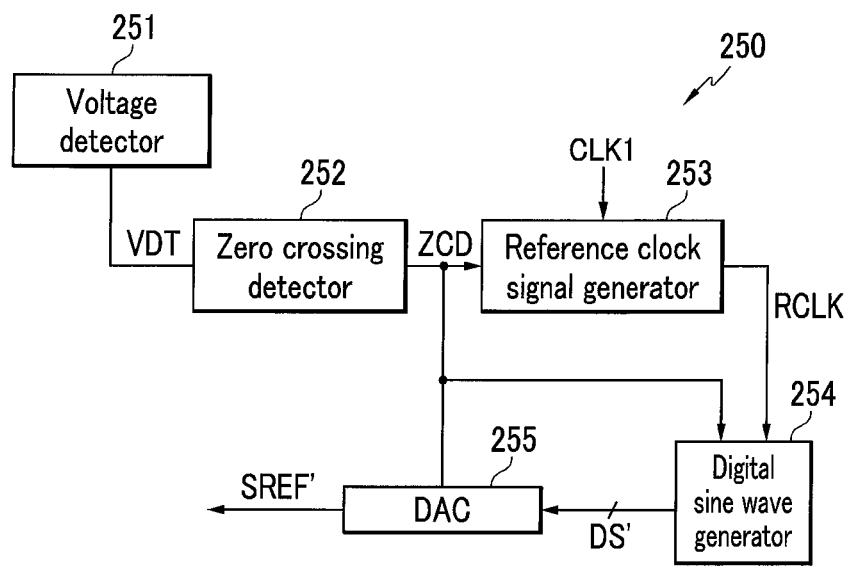
FIG. 8 shows a reference signal generator according to another exemplary embodiment of the present invention.
Figure 9:
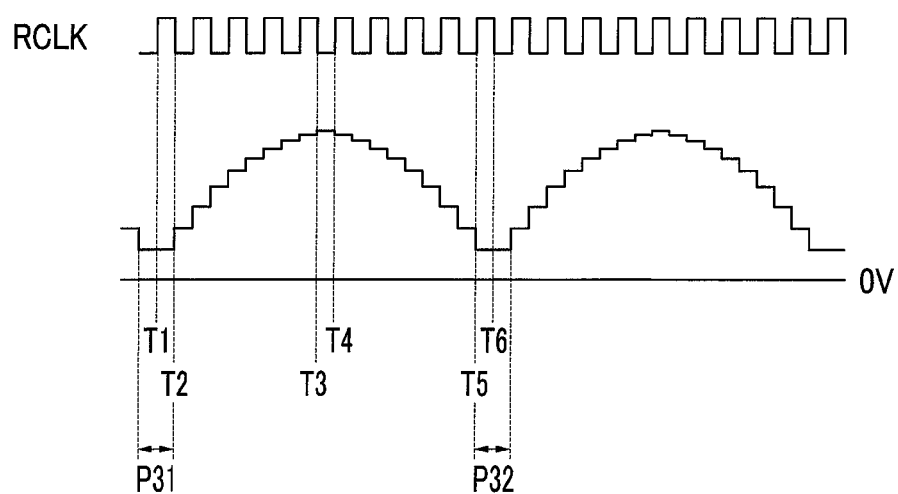
FIG. 9 shows a reference signal according to another exemplary embodiment of the present invention.

Referring to FIGS. 8 and 9, a control device according to another exemplary embodiment of the present invention will now be described. The compensation reference signal is generated by using the zero crossing detecting signal (ZCD) and the reference signal (SREF) in the above-described exemplary embodiment. In another exemplary embodiment of the present invention, the reference signal is maintained at a constant value during the blocking period by controlling the digital signal (DS') that is increased by the reference clock signal (RCLK) to have a constant value during the blocking period. FIG. 8 shows a reference signal generator according to another exemplary embodiment of the present invention. The described exemplary embodiment is applicable to the control device and the converter. FIG. 9 shows a reference signal (SREF') according to another exemplary embodiment of the present invention.

As shown in FIG. 8, the reference signal generator 250 includes a voltage detector 251, a zero crossing detector 252, a reference clock signal generator 253, a digital sine wave generator 254, and a DAC 255. The voltage detector 251, the reference clock signal generator 253, and the DAC 255 respectively correspond to the voltage detector 211, the reference clock signal generator 213, and the DAC 215 according to the described exemplary embodiment, and will not be described. The digital sine wave generator 214 according to the current exemplary embodiment of the present invention is different from the previous embodiment, and the current embodiment does not include the compensator.

The digital sine wave generator 254 receives the zero crossing detecting signal (ZCD) and the reference clock signal (RCLK), and uses the two signals to generate a digital signal (DS') for generating a full-wave rectify sine wave synchronized with the drain voltage (Vd). In this instance, the digital sine wave generator 254 generates an n-bit digital signal (DS') for identifying the blocking period according to the zero crossing detecting signal (ZCD) and having the same value during the period. In detail, in a like manner of the described exemplary embodiment, the digital sine wave generator 254 generates a digital signal (DS') that is increased for a half of one period of the estimated reference signal (SREF') and that is reduced for another half of the period. In this instance, the digital sine wave generator 254 generates a digital signal (DS') that is not increased and decreased but has a constant value during the blocking period.

For example, when the reference number of times is 20, as shown in FIG. 9, the time T1 when the first edge of the reference clock signal (RCLK) is generated in the one period of the reference signal (SREF') belongs to the blocking period P31, and the digital signal (DS') is constant and the reference signal (SREF') is also maintained. The digital signal (DS') is increased from the time T2 when the second edge is generated to the time T3 when the 10th edge is generated, and then the reference signal (SREF') is sequentially increased.

The digital signal (DS') is reduced from the time T4 when the 11th edge is generated to the time T5 when the 19th edge is generated, and the reference signal (SREF') is sequentially reduced. Since the time T6 when the 20th edge is generated belongs to the blocking period P32, the digital signal (DS') is maintained to correspond to the 19th edge generating time, the reference signal (SREF') is also maintained. The increment or decrement of the digital signal (DS') at the edge time is set to be a value that is appropriate for generating the full-wave rectification sine wave.

When the reference signal (SREF') is maintained at a predetermined level for the blocking period, the sensing voltage has a lesser value than the reference signal (SREF') during the blocking period, and the power switch is turned on during the blocking period. Hence, the drain voltage (Vd) is maintained at 0 volts.

Accordingly, the present invention controls the switching operation of the power switch by generating the reference signal synchronized with the drain voltage (Vd). In this instance, the present invention maintains the power switch at the turn-on state by increasing the reference signal and maintaining the same at the high level during the blocking period so as to prevent the reference signal from being influenced by noise that is generated in the drain voltage (Vd).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control device for controlling a switching operation of a power switch, comprising:
    a reference signal generator for detecting a zero crossing time when a voltage at an input end of the power switch becomes a zero voltage, generating a reference signal that is synchronized with the voltage at the input end of the power switch by using the detected zero crossing time, and compensating the generated reference signal with a first voltage that is greater than the zero voltage during a blocking period corresponding to the zero crossing time; and
    a PWM controller for controlling the switching operation of the power switch by comparing a sensing current corresponding to current flowing to the power switch and the compensated reference signal.

2. The control device of claim 1, wherein the reference signal generator includes:
    a voltage detector for generating a detecting voltage corresponding to the voltage at the input end of the power switch;
    a zero crossing detector for comparing the detecting voltage and a predetermined threshold voltage for detecting the blocking period, detecting the blocking period according to the comparison result, and generating a zero crossing detecting signal that is variable by the blocking period;
    a reference clock signal generator for generating a reference clock signal for controlling the reference signal to be synchronized with the voltage at the input end of the power switch by using the zero crossing detecting signal and predetermined clock signals;
    a digital sine wave generator for generating a digital signal that is sequentially increased and is decreased according to the reference clock signal during one period of the reference signal by using the reference clock signal and the zero crossing detecting signal;
    a digital-analog converter for generating the reference signal by converting the digital signal into an analog signal; and
    a compensator for maintaining the reference signal at the first voltage during the blocking period by using the zero crossing detecting signal and the reference signal.

3. The control device of claim 2, wherein the voltage detector includes:
    a voltage-current converting means for generating a detecting current corresponding to the voltage at the input end of the power switch; and
    a resistor to which the detecting current flows, and the detecting voltage is generated by the resistor.

4. The control device of claim 2, wherein the zero crossing detecting signal has a first level during a first period from a time when the detecting voltage that is generated when the power switch is turned off becomes less than the threshold voltage to a time when it becomes greater than the threshold voltage, and a second level that is different from the first level during a period except the first period, wherein the first period is the blocking period.

5. The control device of claim 2, wherein the reference clock signal generator estimates a continuous zero crossing time by using the zero crossing detecting signal, sets a gap between the estimated zero crossing times as a period of the reference signal, and generates a reference clock signal that includes rising and falling edges by a predetermined reference number of times for one period of the reference signal by dividing the clock signals.

6. The control device of claim 5, wherein the estimated zero crossing time is a random time of the blocking period, and the reference number of times is set to generate the reference signal into a waveform that follows the voltage at the input end of the power switch.

7. The control device of claim 5, wherein the digital sine wave generator increases the digital signal from a time when a first edge of the reference clock signal occurring during one period of the reference signal to a time when an n-th edge of the reference clock signal corresponding to a half of the reference number of times occurs, and it reduces the digital signal from a time when an (n+1)-th edge is generated to a time when an edge of the reference clock signal corresponding to the reference number of times occurs.

8. The control device of claim 1, wherein the reference signal generator includes:
    a voltage detector for generating a detecting voltage corresponding to the voltage at the input end of the power switch;
    a zero crossing detector for comparing the detecting voltage and a predetermined threshold voltage for detecting the blocking period, detecting the blocking period according to the comparison result, and generating a zero crossing detecting signal that is variable by the blocking period;
    a reference clock signal generator for generating a reference clock signal for controlling the reference signal to be synchronized with the voltage at the input end of the power switch by using the zero crossing detecting signal and predetermined clock signals;
a digital sine wave generator for generating a digital signal that is sequentially increased and is decreased according to the reference clock signal during one period of the reference signal by using the reference clock signal and the zero crossing detecting signal; and
    a digital-analog converter for generating the reference signal by converting the digital signal into an analog signal, wherein the digital signal is maintained during the blocking period.

9. The control device of claim 8, wherein the voltage detector includes:
- a voltage-current converting means for generating a detecting current corresponding to the voltage at the input end of the power switch; and
- a resistor to which the detecting current flows, and the detecting voltage is generated by the resistor.

10. The control device of claim 8, wherein the zero crossing detecting signal has a first level during a first period from a time when the detecting voltage that is generated when the power switch is turned off becomes less than the threshold voltage to a time when it becomes greater than the threshold voltage, and a second level that is different from the first level during a period except the first period, and the first period is the blocking period.

11. The control device of claim 8, wherein the reference clock signal generator estimates a continuous zero crossing time by using the zero crossing detecting signal, sets a gap between the estimated zero crossing times as a period of the reference signal, and generates a reference clock signal that includes rising and falling edges by a predetermined reference number of times for one period of the reference signal by dividing the clock signals.

12. The control device of claim 11, wherein the estimated zero crossing time is a random time of the blocking period, and the reference number of times is set to generate the reference signal into a waveform that follows the voltage at the input end of the power switch.

13. A switching control method of a power switch comprising:
- detecting a zero crossing time when a voltage at an input end of the power switch becomes a zero voltage;
- generating a reference signal that is synchronized with the voltage at the input end of the power switch by using the detected zero crossing time; and
- compensating the generated reference signal with a first voltage that is greater than the zero voltage during a blocking period corresponding to the zero crossing time.

14. The switching control method of claim 13, further including controlling the switching operation of the power switch by comparing a sensing current corresponding to current flowing to the power switch and the compensated reference signal.

15. The switching control method of claim 13, wherein the generating of a reference signal includes:
- generating a detecting voltage corresponding to the voltage at the input end of the power switch;
- comparing the detecting voltage and a predetermined threshold voltage for detecting the blocking period, detecting the blocking period according to the comparison result, and generating a zero crossing detecting signal that is variable by the blocking period;
- generating a reference clock signal for controlling the reference signal to be synchronized with the voltage at the input end of the power switch by using the zero crossing detecting signal and predetermined clock signals;
- generating a digital signal that is sequentially increased and is decreased according to the reference clock signal during one period of the reference signal by using the reference clock signal and the zero crossing detecting signal; and
- generating the reference signal by converting the digital signal into an analog signal.

16. The switching control method of claim 15, wherein the digital signal is maintained during the blocking period.

17. An LED light emitting device comprising:
- an LED string including a plurality of LEDs;
- a converter for supplying current to the LED string according to a switching operation by a power switch; and
- a control device for detecting a zero crossing time when a voltage at an input end of the power switch becomes a zero voltage, generating a reference signal that is synchronized with the voltage at the input end of the power switch by using the detected zero crossing time, compensating the generated reference signal with a first voltage that is greater than the zero voltage during a blocking period corresponding to the zero crossing time, and controlling and switching the switching operation of the power switch by comparing a sensing current corresponding to current flowing to the power switch and the compensated reference signal.

18. The LED light emitting device of claim 17, wherein the control device includes a reference signal generator for generating and compensating the reference signal, and the reference signal generator includes:
- a voltage detector for generating a detecting voltage corresponding to the voltage at the input end of the power switch;
- a zero crossing detector for comparing the detecting voltage and a predetermined threshold voltage for detecting the blocking period, detecting the blocking period according to the comparison result, and generating a zero crossing detecting signal that is variable by the blocking period;
- a reference clock signal generator for generating a reference clock signal for controlling the reference signal to be synchronized with the voltage at the input end of the power switch by using the zero crossing detecting signal and predetermined clock signals;
- a digital sine wave generator for generating a digital signal that is sequentially increased and is decreased according to the reference clock signal during one period of the reference signal by using the reference clock signal and the zero crossing detecting signal;
- a digital-analog converter for generating the reference signal by converting the digital signal into an analog signal; and
- a compensator for maintaining the reference signal at the first voltage during the blocking period by using the zero crossing detecting signal and the reference signal.

19. The LED light emitting device of claim 17, wherein the control device includes a reference signal generator for generating and compensating the reference signal, and the reference signal generator includes:
- a voltage detector for generating a detecting voltage corresponding to the voltage at the input end of the power switch;
- a zero crossing detector for comparing the detecting voltage and a predetermined threshold voltage for detecting the blocking period, detecting the blocking period according to the comparison result, and generating a zero crossing detecting signal that is variable by the blocking period;
- a reference clock signal generator for generating a reference clock signal for controlling the reference signal to be synchronized with the voltage at the input end of the power switch by using the zero crossing detecting signal and predetermined clock signals;

a digital sine wave generator for generating a digital signal that is sequentially increased and is decreased according to the reference clock signal during one period of the reference signal by using the reference clock signal and the zero crossing detecting signal; and a digital-analog converter for generating the reference signal by converting the digital signal into an analog signal, wherein the digital signal is maintained at the first voltage during the blocking period.

\* \* \* \* \*